(12) United States Patent
Lineman et al.

(10) Patent No.: US 8,899,470 B2
(45) Date of Patent: Dec. 2, 2014

(54) METHOD FOR BONDING REFRACTORY CERAMIC AND METAL

(75) Inventors: David M. Lineman, Painted Post, NY (US); Wenchao Wang, Ithaca, NY (US); Randy D. Ziegenhagen, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/080,213

(22) Filed: Apr. 1, 2008

(65) Prior Publication Data

US 2009/0142608 A1    Jun. 4, 2009

Related U.S. Application Data

(60) Provisional application No. 61/004,648, filed on Nov. 29, 2007.

(51) Int. Cl.
*B23K 31/02* (2006.01)
*B23K 20/00* (2006.01)
*C04B 37/02* (2006.01)
*C03B 7/04* (2006.01)

(52) U.S. Cl.
CPC .......... *C04B 37/026* (2013.01); *C04B 2237/52* (2013.01); *C04B 2237/125* (2013.01); *C04B 2235/6567* (2013.01); *C04B 2237/068* (2013.01); *C04B 2237/408* (2013.01); *C04B 37/025* (2013.01); *C04B 2237/343* (2013.01); *C04B 2235/656* (2013.01); *C03B 7/04* (2013.01); *C04B 2237/62* (2013.01); *Y10S 228/903* (2013.01)
USPC .......... 228/120; 228/175; 228/193; 228/196; 228/262.1; 228/262.21; 228/262.7; 228/903; 228/122.1

(58) Field of Classification Search
USPC .......... 228/122.1, 120, 175, 193, 196, 262.1, 228/262.2, 262.21, 262.7, 469
See application file for complete search history.

(56) References Cited

U.S. PATENT DOCUMENTS 3,445,210 A * 5/1969 Mizuo et al. ................. 65/43
3,552,955 A * 1/1971 Martyniuk .................. 419/27

(Continued)

FOREIGN PATENT DOCUMENTS

EP          1 406 317        4/2004
WO      WO 2004/083134      9/2004

OTHER PUBLICATIONS

Corresponding Taiwan App. No. 97146094, filed Nov. 27, 2008, Office Action.

(Continued)

*Primary Examiner* — Erin Saad
(74) *Attorney, Agent, or Firm* — Ryan T. Hardee

(57) ABSTRACT

A method is disclosed for mechanically bonding a metal component to a ceramic material, comprising providing a metal component comprising an anchor material attached to at least a first portion of one surface of the metal component; providing a ceramic material having a first surface and a second surface, wherein the ceramic material defines at least one conduit extending from the first surface to the second surface, wherein the at least one conduit has a first open end defined by the first surface, a second open end defined by the second surface, a continuous sidewall and a cross sectional area; positioning the ceramic material such that at least a portion of the at least one conduit is in overlying registration with at least a portion of the anchor material; and applying a bonding agent into at least a portion of the at least one conduit.

22 Claims, 5 Drawing Sheets

(56) References Cited

U.S. PATENT DOCUMENTS

| | | | |
|---|---|---|---|
| 5,001,019 A * | 3/1991 | Ito et al. ................... | 428/621 |
| 5,238,485 A * | 8/1993 | Shubert ..................... | 75/421 |
| 7,273,569 B2 | 9/2007 | Walter et al. ............... | 252/500 |
| 2003/0056515 A1 | 3/2003 | Bast et al. .................. | 60/752 |
| 2004/0052574 A1* | 3/2004 | Grubb et al. ............... | 403/270 |
| 2004/0155739 A1* | 8/2004 | Arndt et al. ................ | 335/216 |
| 2004/0162223 A1* | 8/2004 | Walter et al. ............... | 505/230 |
| 2006/0086146 A1 | 4/2006 | Grzesik et al. .............. | 65/376 |
| 2006/0096322 A1* | 5/2006 | Singer et al. ............... | 65/135.1 |
| 2006/0147699 A1 | 7/2006 | Sarkar et al. ............... | 428/323 |
| 2010/0186365 A1 | 7/2010 | Grote et al. ................ | 60/39.37 |

OTHER PUBLICATIONS

JP, Application No. 2010-535956, filed May 31, 2010, Office Action.

* cited by examiner

US 8,899,470 B2

METHOD FOR BONDING REFRACTORY CERAMIC AND METAL

CLAIMING BENEFIT OF PRIOR FILED U.S. APPLICATION

This application claims the benefit of U.S. Provisional Application Ser. No. 61/004,648, filed on Nov. 29, 2007. The content of this document and the entire disclosure of publications, patents, and patent documents mentioned herein are incorporated by reference.

BACKGROUND OF THE INVENTION

1. Field of the Invention

The present invention relates to refractory ceramics and specifically, to refractory ceramics for use in glass forming and/or delivery systems.

2. Technical Background

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a glass supply pipe which provides molten glass to a collection trough formed in a refractory body known as an isopipe. During the overflow downdraw fusion process, molten glass passes from the supply pipe to the trough and then overflows the top of the trough on both sides, thus forming two sheets of glass that flow downward and then inward along the outer surfaces of the isopipe.

Surfaces of a glass forming and/or delivery system that are in contact with molten glass are typically comprised of a precious metal, such as platinum. The stability of the glass supply pipe and other components can be dependent upon the materials and techniques of construction. When subjected to operating temperatures of 1,000° C. or more, conventional materials can sag, creep, and/or deform, resulting in system and/or component failure.

There is a need to address the aforementioned problems and other shortcomings associated with glass forming and/or delivery systems and the traditional approaches for producing components for glass forming and/or delivery systems. These needs and other needs are satisfied by the methods and articles of the present invention.

SUMMARY OF THE INVENTION

The present invention relates to refractory ceramics and specifically, to refractory ceramics for use in glass forming and/or delivery systems.

In a first aspect, the present invention provides a method for mechanically bonding a metal component to a ceramic material, comprising providing a metal component comprising an anchor material attached to at least a first portion of one surface of the metal component; providing a ceramic material having a first surface and a second surface, wherein the ceramic material defines at least one conduit extending from the first surface to the second surface, wherein the at least one conduit has a first open end defined by the first surface, a second open end defined by the second surface, a continuous sidewall and a cross sectional area; positioning the ceramic material such that at least a portion of the at least one conduit is in overlying registration with at least a portion of the anchor material; and applying a bonding agent into at least a portion of the at least one conduit.

In a second aspect, the present invention provides an article produced by the method described above.

In a third aspect, the present invention provides an article comprising a metal component; an anchor material attached to at least a portion of the metal component; and a ceramic material having a first surface and a second surface, wherein the first and second surfaces define at least one conduit extending from the first surface to the second surface, wherein the at least one conduit has a continuous sidewall and a cross sectional area, the ceramic material being positioned on at least a portion of an exterior surface of the metal component and in overlying registration with at least a portion of the anchor material; and wherein at least a portion of the at least one conduit comprises a bonding agent, and wherein at least a portion of the anchor material is substantially embedded in at least a portion of the bonding agent.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION OF THE INVENTION

Figure 1:
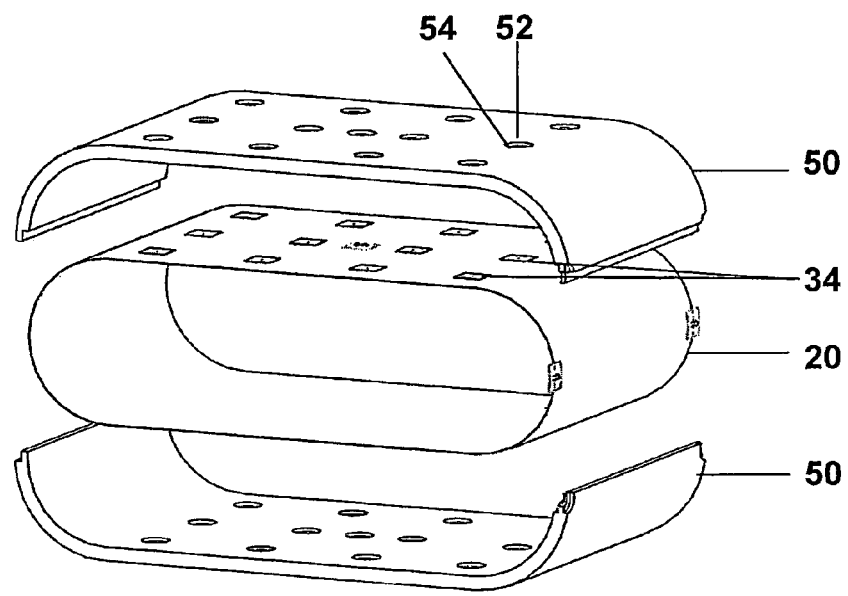
FIG. 1 is a schematic view of a disassembled holey clam shell and metal component welded with mesh patches, in accordance with various aspects of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known embodiments. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optionally substituted component" means that the component can or can not be substituted and that the description includes both unsubstituted and substituted aspects of the invention.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As briefly introduced above and with reference to the figures, the present invention provides a method for mechanically bonding a metal component and a ceramic material, such as, for example, in a delivery pipe of a glass forming system. Among other aspects described in detail below and with reference to the figures, the inventive method comprises the use of a metal component 20, a ceramic material 50, and an anchor material, such as, for example, a metal mesh 34 or a plurality of metal particles, to provide a mechanically strong bond between the metal component 20 and the ceramic material 50.

While the methods of the present invention are not intended to be limited to a particular application, they can be used to reduce and/or eliminate sag of components in a glass forming and/or delivery system. Conventional materials used in a glass forming and/or delivery system can sag substantially during use because the mechanical strength at operating temperatures is typically not sufficient to support the weight of the components themselves. The present invention provides methods to improve the strength and durability of glass forming and/or delivery components by employing anchor materials to help bond the ceramic material to a metal component.

The present invention provides a novel approach to mechanically bond a ceramic material with a metal. The invention provides a method for attaching an anchor material to a metal component, and then attaching a ceramic material positioned on or around the metal component. The ceramic material can be attached to the metal component by placing a bonding agent into one or more holes or conduits in the ceramic material, wherein at least a portion of the bonding agent becomes mechanically bound to the anchor material on the metal component. The ceramic material can provide support to a metal component, thereby extending the useful life of the metal component and allowing the use of a thinner metal component. In applications, such as glass forming systems, where the metal component comprises a precious metal, use of a thinner metal component can result in significant cost savings.

Ceramic Material

The ceramic material of the present invention can be any ceramic material suitable for bonding to a metal component. The ceramic material can comprise a refractory oxide, such as, for example, $ZrO_2$, $SiO_2$, $CaO$, $MgO$, $Al_2O_3$, other refractory oxides, and/or mixtures thereof. The ceramic material can comprise an individual or multiple ceramic materials of varying compositions, particle sizes, and phases. The ceramic material can also comprise additives and/or sintering aids. In one aspect, the ceramic material is compatible with conventional glass forming and/or delivery systems. In various aspects, the ceramic material is capable of enduring temperatures typical of those in a glass forming and/or delivery system, for example, up to about 1,400, 1,450, 1,500, 1,600, 1,650, or 1,700° C. or more. Ceramic materials are commercially available and one of skill in the art could readily select an appropriate ceramic material for use in a particular article and/or application. In one aspect, the ceramic material comprises an alumina and/or zirconia material such as a high density, high purity alumina or zirconia available from Emhart Glass Manufacturing, Inc., Enfield, Conn., USA.

The ceramic material of the present invention can comprise one or multiple pieces of the same or different individual ceramic materials. If multiple pieces are used, each individual pieces can be arranged adjacent to another piece or in partial or complete overlying registration with another piece to form, for example, a mutli-layered shell design.

In one aspect, the ceramic material has a material strength sufficient to resist deformation and/or sag at operating temperatures of the intended application. For example, a ceramic material used in a glass delivery system should have a strength suitable to withstand temperatures of about 1,400° C. or more without creep or sag.

The ceramic material can be provided in any form and/or shape suitable for the intended use. In one aspect, a ceramic material is a sheet good, such as a flat plate. One or more such plates can be attached to one or more surfaces of the metal component to provide, for example, structural support. In one aspect, a single plate comprising a ceramic material is positioned and attached to one surface of the metal component. In another aspect, two or more plates are positioned and attached to various surfaces of the metal component. It is not necessary that any two or more pieces of a ceramic material, such as a plate, have the same geometry and/or composition, and aspects having both the same and varying geometries and compositions are intended to be included as part of the invention. In a specific example, the metal component is a flexible tube and two ceramic plates are positioned and attached to opposing exterior surfaces of the flexible metal tube.

In another aspect, the ceramic material is one or more pieces of a ceramic material formed into a predetermined shape, such that, for example, the inner dimensions of the one or more pieces of ceramic material match the profile of the outer dimensions of a metal component to which they are to be attached. In a specific aspect, the ceramic material comprises one or more pieces that form a clam shell around a flexible metal tube, as illustrated in FIGS. 1, 2, 3, and 5. In such a specific aspect, each individual piece of a ceramic material can form the top or bottom half of clam shell design. In such an aspect, each individual piece can be of varying length, for example, from about 6 inches to about 36 inches in length. In one specific aspect, each individual piece is about 12 inches long.

The thickness of a ceramic material can be any such thickness suitable for the intended application and can vary depending on factors, such as, for example, the operating temperatures to which the material will be exposed, creep strength, and the shape and geometric design of the material. In various aspects, the thickness of a ceramic material can range from about 0.25 inches to about 4 inches, for example, about 0.25, 0.35, 0.4, 0.5, 0.55, 0.6, 0.75, 0.8, 0.9, 0.95, 1, 1.25, 1.5, 2, 2.5, 3, 3.5, or 4 inches. In a specific aspect, the thickness of a ceramic material is about 0.5 inches. In other aspects, the thickness of a ceramic material can be less than 0.25 inches or greater than about 4 inches, and the present invention is not intended to be limited to any particular thickness.

The ceramic material 50 of the present invention, or any individual piece thereof, can have one or more holes 52 extending from a first surface to a second surface thereof. Such holes can be described as conduits 52 defined by the ceramic material, each one or more conduit having a first open end defined by the first surface of the ceramic material, and a second open end defined by the second surface of the ceramic material. Each of the one or more conduits has a continuous sidewall and a cross sectional area. Any two or more conduits, if present, can have the same of differing sizes, shapes, profiles, and/or cross sectional areas.

In one aspect, a given piece of a ceramic material can be provided as a solid planar material without any such holes or conduits, or can be provided wherein one or more such holes or conduits were pre-formed (FIG. 5), such as, for example, during casting or shaping of the ceramic material. The holes or conduits can be positioned at pre-determined locations, such that at least a portion of a conduit can align with at least a portion of an anchor material attached to a metal component 20 to which the ceramic material is to be secured. If a ceramic material is provided without conduits or with insufficient conduits to securely attach to a metal component, one or more conduits can be created by, for example, drilling a hole extending from the first surface to the second surface of the ceramic material.

The size and profile of any one or more conduits in a ceramic material can be the same or different from any other conduits. In one aspect, all of a plurality of conduits in a ceramic material are the same or substantially the same size and have the same or substantially the same sidewall profile. In another aspect, two or more conduits have different sizes and/or different sidewall profiles. In various aspects, the diameter of any one or more conduits can be from about 0.75 inches to about 1 inch, for example, about 0.75, 0.8, 0.85, 0.9, 0.95, or 1 inch. In other aspects, the diameter of any one or more conduits can be less than about 0.75 inches or greater than about 1 inch and the present invention is not intended to be limited to a particular diameter.

The sidewall profile of any one or more conduits can any suitable design such that when the ceramic material is aligned with the metal component and an anchor material attached thereto, a bonding agent can be applied in at least a portion of the conduit, flow through and/or around at least a portion of the anchor material, and when cured and/or solidified, provide a mechanical bond attaching the ceramic material to the metal component. In various aspects, the sidewall profile of any one or more conduits can be straight, curved, angled, or stepped. In one aspect, the sidewall profile of any one or more conduits is straight. In another aspect, the sidewall profile of the conduit is chamfered. In another aspect, the sidewall profile of the conduit is dumbbell shaped.

Figure 4:
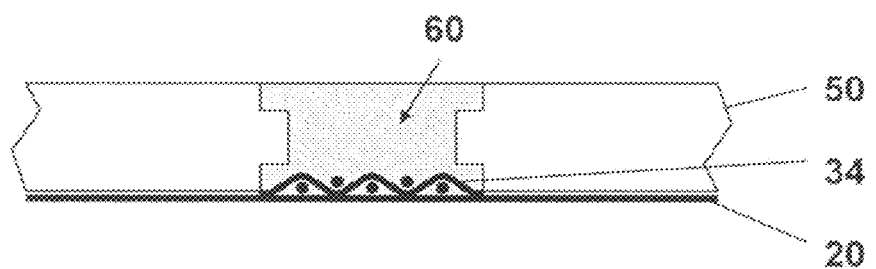
FIG. 4 is a cross section view of an individual casting hole, illustrating a rivet shaped ceramic castable mechanically bonding the metal component and the clam shell components together, in accordance with various aspects of the present invention.
Figure 5:
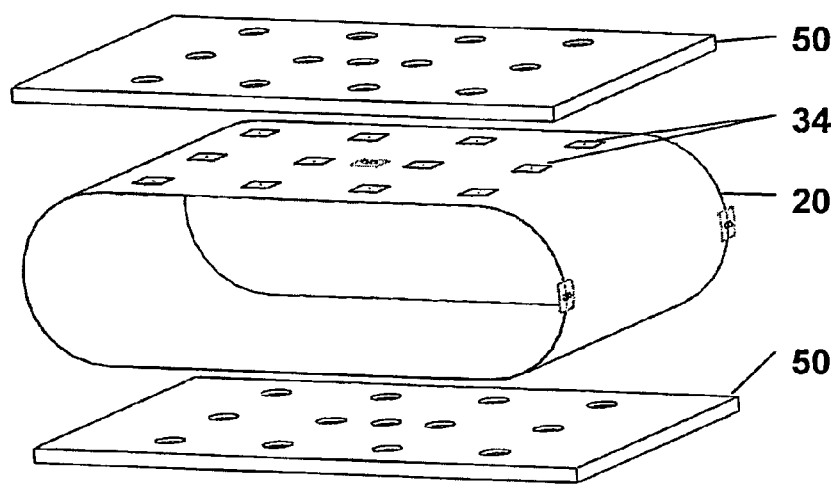
FIG. 5 is an exploded schematic of an alternate design, wherein two flat holey plates are each positioned on opposing sides of the metal component, in accordance with various aspects of the present invention.

In yet another aspect, the sidewall profile of any one or more conduits is stepped such that the cross sectional area of the conduit at either the first surface and/or the second surface is greater than the cross sectional area at other points of the conduit, as illustrated in FIG. 4. In a specific aspect, the cross sectional area of a conduit at both the first surface and the second surface is greater than that in the middle of the conduit. Such a sidewall profile can be obtained by, for example, drilling a counterbore 54 at either the first surface and/or the second surface, aligned with the axis of the conduit and having a larger diameter than the conduit.

It is preferred that the sidewall profile of any one or more conduits be designed so as to form a rivet shaped body of bonding agent that is secured in place once the bonding agent is cured and/or fired. Such an interlocking connection can result in a tighter fit between the metal component and ceramic component.

Metal Component

The metal component 20 of the present invention can be any component suitable for mechanically bonding to a ceramic material. While the aspects described herein are related to a glass forming and/or delivery system, the present invention can be useful in any application where a metal component can be mechanically bonded to a ceramic material and the present invention is not intended to be limited to glass forming and/or delivery systems. The metal component, in one aspect, is a metal component that will deform under exposure to high temperatures, such as those typical in a glass forming system. In one aspect, the metal component is a portion of a glass forming system. In a specific aspect, the metal component is a metal portion of a glass delivery pipe. In another aspect, the metal component is a component, such as a sheet, that can be fabricated into a portion of a glass forming and/or delivery system. The specific dimensions and/or geometry of a metal component can vary depending on the intended application. In one aspect, a metal component can be from about 0.010 inches thick to about 0.125 inches thick, or greater, for example, about 0.01, 0.015, 0.02, 0.025, 0.03, 0.035, 0.04, 0.05, 0.06, 0.08, 0.9, 0.1, or 0.125 inches thick. In one specific aspect, the metal component can be about 0.040 inches thick. In another aspect, the metal component can be about 0.010 inches thick. In other various aspects, the metal component can be thinner than 0.010 inches or thicker than 0.125 inches thick and the present invention is not intended to be limited to a particular thickness. It should be understood that the thickness of one or more metal components can vary and that the thickness of any individual metal component can be different at various portions of the metal component.

The particular form of the metal component can be any such form suitable for the intended application, such as, for example, a tube or sheet. In one aspect, the metal component is a tube. In a specific aspect, the metal component is a tube formed from a sheet of a metal as described herein. Such a tube can be prepared by seam welding the edges of a metal sheet to form a tube. The specific geometry and/or shape of any cross section of the tube can vary and the present invention is not intended to be limited to any particular geometry. In one aspect, the tube is flexible and can move and/or change shape as the volume of one or more fluids passing therein change.

The metal component of the present invention can comprise any metal suitable for use in the intended application, such as, for example, a glass forming system. In various aspects, the metal component can comprise at least one noble metal and/or noble metal alloy, at least one platinum group metal and/or platinum group metal alloy, or a combination thereof. In one aspect, the metal component comprises a noble metal, such as gold, silver, tantalum, platinum, palladium, or rhodium. In another aspect, the metal component comprises a platinum group metal, such as, ruthenium, rhodium, platinum, palladium, osmium, or iridium. In another aspect, the metal component can comprise at least one refractory metal, such as, for example, tungsten, molybdenum, niobium, tantalum, rhenium, and alloys thereof. In various specific aspects, the metal component comprises platinum and/or a platinum/rhodium alloy, such as a 90/10 wt. % or 80/20 wt. % platinum/rhodium alloy. Metal components and materials for fabrication of metal components are commercially available and one of skill in the art could readily select an appropriate metal component.

Anchor Material

The anchor material of the present invention can be attached to at least a portion of the metal component and can provide a surface that can form a mechanical bond with at least a portion of a bonding agent. The anchor material of the present invention can be any material suitable for use in a metal/ceramic bonded application and that is capable of attaching to a metal component. The anchor material can comprise any geometry capable of attaching to a metal component and forming a mechanical bond with a bonding agent attached thereto. In one aspect, the anchor material is embedded and/or interlocked with at least a portion of the bonding agent 60. The anchor material can comprise, for example, a metal mesh 34, a plurality of metal particles, a sheet metal structure, or a combination thereof.

In one aspect, the anchor material is a mesh, such as a metal mesh. A metal mesh anchor material can have multiple openings through which a bonding agent can flow. The bonding agent can, in one aspect, fill at least a portion of the openings and solidify, forming a mechanical bond between the metal component and the solidified bonding agent. A metal mesh anchor material can comprise any metal mesh capable of attaching to the metal component and occluding at least a portion of a bonding agent. In various aspects, the metal mesh can have a mesh size of, for example, from about 3 mesh to about 80 mesh, for example, about 3, 4, 5, 8, 10, 12, 14, 18, 20, 22, 24, 28, 30, 36, 40, 44, 48, 50, 52, 56, 58, 60, 62, 64, 68, 70, 72, 74, 76, 78, or 80 mesh; from about 10 to about 40 mesh, for example, about 10, 12, 14, 18, 20, 22, 24 28, 30, 32, 34, 36, 38, or 40 mesh; or from about 10 to about 25 mesh, for example, 10, 12, 14, 18, 20, 22, 24, or 25 mesh. As used herein, the term "mesh size" is intended to refer to the number of openings per linear inch of a material. In one aspect, the metal mesh is a 20 mesh screen. In another aspect, the metal mesh is a 10 mesh screen. In various other aspects, the metal mesh can have a mesh size of less than 3 or greater than 80, and the present invention is not intended to be limited to a specific mesh size, provided that the metal mesh can allow a bonding agent to flow through and/or fill at least a portion of the mesh openings, solidify, and form a mechanical bond. In one aspect, the anchor material is capable of being embedded or substantially embedded in at least a portion of a bonding agent.

In various aspects, a metal mesh can comprise a wire having a nominal diameter of, for example, from about 0.003 inches to about 0.060 inches, for example, about 0.003, 0.006, 0.009, 0.012, 0.015, 0.018, 0.020, 0.025, 0.030, 0.036, 0.040, 0.044, 0.050, 0.058, or 0.060 inches; or from about 0.005 inches to about 0.020 inches, for example, about 0.005, 0.008, 0.010, 0.012, 0.018, or 0.020 inches. In one aspect, the metal mesh comprises a wire having a nominal diameter of 0.008 inches. In another aspect, the metal mesh comprises a wire having a nominal diameter of 0.010 inches. In various other aspects, the metal mesh can comprise a wire having a nominal diameter of less than 0.003 inches or greater than 0.020 inches, and the present invention is not intended to be limited to a specific wire diameter. A metal mesh can be, for example, woven, knitted, or other physical forms and the present invention is not limited to a particular form of metal mesh. In one aspect, the metal mesh is woven. The size of, for example, a metal mesh can vary depending upon the size and dimensions of the desired article and the properties (e.g., Theological properties) of a bonding agent, provided that the metal mesh can allow a bonding agent to flow through and/or fill at least a portion of the mesh openings, solidify, and form a mechanical bond. In one aspect, a metal mesh is capable of interlocking or embedding at least a portion of the bonding agent applied thereto. In another aspect, a metal mesh having a small mesh size is utilized when a fluid bonding agent having a viscosity sufficiently low to allow at least a portion of the bonding agent to flow through and/or fill at least a portion of the mesh openings is to be applied. In another aspect, a metal mesh having a large mesh size is utilized when a more viscous bonding agent is to be applied. The mesh size and wire diameter of a metal mesh can be selected to withstand a particular stress, for example, under operating conditions.

The anchor material of the present invention can comprise metal particles that can be attached to a metal component. The anchor material can comprise a plurality of metal particles dispersed on at least a portion of one surface of a metal component. The metal particles of an anchor material, if the anchor material comprises metal particles, can have regular, irregular and/or varying shapes. It is not necessary that the metal particles have a specific shape or that all metal particles have the same shape. It is preferred that at least a portion of the plurality of metal particles, if present, have a shape capable of mechanically bonding a bonding agent applied thereto. In one aspect, the plurality of metal particles are attached and positioned such that a bonding agent can flow around at least a portion of the plurality of metal particles and solidify, forming a mechanical bond. In another aspect, a plurality of metal particles can interlock or occlude a bonding agent applied thereto. In various aspect, the metal particles of an anchor material can have a diameter of, for example, from about 0.003 inches to about 0.060 inches, for example, about 0.003, 0.006, 0.009, 0.012, 0.015, 0.018, 0.020, 0.024, 0.030, 0.036, 0.040, 0.048, 0.050, 0.052, or 0.060 inches; or from about 0.008 to about 0.020 inches, for example, about 0.008, 0.012, 0.014, 0.016, 0.018, or 0.020 inches. In one aspect, the metal particles have a diameter of about 0.016 inches. In another aspect, the metal particles have a diameter of about 0.020 inches. In various other aspects, the metal particles can have a diameter smaller than 0.003 inches or greater than 0.020 inches. As used herein, the term "diameter" refers to a median diameter of, for example, a metal particle. It is understood that the size and shape of metal particles can vary and are typically distributional properties. In a distribution of, for example, particle sizes, the endpoints of the distribution range can be above, at, or below the ranges described above. Thus, in one aspect, the metal particles have a median diameter of about 0.020 inches and can range from about 0.015 inches to about 0.025 inches.

The anchor material of the present invention can comprise a sheet metal structure. A sheet metal structure can comprise, for example, a corrugated piece of metal or a formed piece of metal that can be attached to a metal component and can accept and interlock a bonding agent. In one aspect, a sheet metal structure is designed and positioned such that a bonding agent can flow through, around, and/or over at least a portion thereof and solidify, forming a mechanical bond.

The anchor material of the present invention can comprise any metal suitable for use in the intended application, such as, for example, a glass forming system. In various aspects, the anchor material can comprise at least one noble metal and/or noble metal alloy, at least one platinum group metal and/or platinum group metal alloy, at least one refractory metal and/or refractory metal alloy, or a combination thereof. In one aspect, the anchor material comprises a noble metal, such as gold, silver, tantalum, platinum, palladium, or rhodium. In another aspect, the anchor material comprises a platinum group metal, such as, ruthenium, rhodium, platinum, palladium, osmium, or iridium. In another aspect, the anchor material comprises a refractory metal, such as tungsten, molybdenum, niobium, tantalum, or rhenium. In various aspects, the anchor material comprises platinum and/or a platinum/rhodium alloy. In a specific aspect, the anchor material is platinum. In another specific aspect, the anchor material is a platinum/rhodium (80/20) alloy. In yet another specific aspect, the anchor material is a platinum/rhodium (90/10) alloy.

The anchor material can comprise an individual or multiple metals. Further, if the anchor material comprises multiple individual pieces, such as for example, a plurality of metal particles, one or more pieces of metal mesh, or a combination thereof, each individual piece can comprise either the same or differing compositions. The size and/or shape of any one or more pieces of anchor material, such as, for example, metal mesh, can vary and can be the same or different from other pieces of anchor material. In various aspects, an anchor material can be a square, disc, or strip of metal mesh material, and the present invention is not intended to be limited to any particular size and/or shape. The composition of a particular anchor material can be the same or different from the composition of a metal component, provided that the anchor material is capable of being attached to the metal component. In a specific aspect, the anchor material comprises a metal mesh having a 20 mesh screen size, a nominal wire diameter of about 0.008 inches, and is comprised of a platinum/rhodium (90/10) alloy. Anchor materials, such as, for example, platinum mesh and platinum particles, are commercially available (e.g., Alfa Aesar, Ward Hill, Mass., USA) and one of skill in the art could readily select an appropriate anchor material.

Attachment of Anchor Material

The metal component of the present invention can, in one aspect, be provided with one or more anchor materials, as described herein, attached to at least one surface thereof. In another aspect, the metal component can be provided with no anchor materials or insufficient anchor materials attached thereto, wherein one or more anchor materials can be subsequently attached.

The anchor material of the present invention can be attached to at least a portion of one surface of a metal component. It is not necessary that an anchor material completely cover a metal component as the anchor material need only be present in a quantity and position sufficient to form a mechanical bond with at least a portion of a bonding agent. In one aspect, the anchor material is attached to at least a portion of a metal component in a discontinuous fashion such that the anchor material is not present in a continuous layer.

The metal component, such as, for example, a platinum alloy sheet, can optionally be cleaned to remove oil and other surface contaminants and impurities prior to attachment. Such a cleaning step can be performed, for example, using conventional detergents, surfactants, and/or solvents.

The surface of a metal component can optionally be roughened prior to attachment using, for example, chemical and/or mechanical techniques. In one aspect, the surface of a metal component to which an anchor material is to be attached can be roughened by sand and/or bead blasting. In another aspect, the surface of a metal component to which an anchor material is to be attached can be roughened by a chemical etching technique. It is not necessary that a cleaning or roughening step be performed prior to attachment.

The anchor material of the present invention can be distributed on at least a portion of one surface of the metal component. In one aspect, the anchor material can be positioned in a plurality of discrete locations on at least a portion of a surface of the metal component. For example, an anchor material comprising a metal mesh can be a single piece of metal mesh or multiple pieces of metal mesh positioned on a surface of the metal component. In one aspect, the one or more pieces of an anchor material attached to the surface of a metal component can be positioned at predetermined locations to correspond to the one or more conduits of a ceramic material to which the metal component is to be attached. In one aspect, a piece of anchor material is positioned such that at least a portion of the anchor material will be in overlying registration with at least a portion of an open end of a conduit. In another aspect, a piece of anchor material is positioned such that the anchor material and the open end of a conduit in the ceramic material to be attached thereto are in complete overlying registration.

In one aspect, a piece of metal mesh can be cut to a size and shape that is similar to and/or matches the size and shape of a metal component. In another aspect, a piece of metal mesh can be smaller than a metal component. An anchor material comprised of metal particles can be distributed randomly, in a pattern, or in a uniform manner on a surface of the metal component. In one aspect, a metal particle anchor material is uniformly distributed across the portion of the metal component surface to which a bonding agent is to be applied. In another aspect, a metal particle anchor material can be distributed in a predetermined pattern to enhance bonding and thus, strength of a bonded article in particular high-stress regions.

After contacting an anchor material to a portion of a metal component, the anchor material can be attached using any suitable technique. In various aspect, the anchor material can be attached using one or more welding techniques, such as, for example, arc welding, resistance welding, fusion welding, spot welding, seam welding, electron beam welding, ultrasonic welding, laser welding, or a combination thereof. In a specific aspect, at least a portion of the anchor material is spot welded to the metal component at one or more locations so as to prevent movement of the anchor material during assembly. In one aspect, the anchor material can be attached to a metal component by heating the metal component and anchor material at a time and temperature sufficient to fuse at least a portion of the anchor material to the metal component. It is not necessary that the anchor material completely fuse to the metal component so long as a sufficient quantity of anchor material is fused to allow bonding of a ceramic material. In various aspects, the contacted anchor material and metal component can be heated at a temperature of at least about 1,300° C., for example, 1,300, 1,400, 1,500, 1,600, 1,650, 1,700° C. or greater, for a period sufficient to attach at least a portion of the anchor material to at least a portion of the metal component, such as, at least about 0.25 hours, for example, about 0.25, 0.5, 0.75, 1, 2, 4, 6, 8, 10, 12, 16, or 24 hours; for at least about 2 hours, for example, about 2, 4, 6, 8, 10, 12, 16, or 24 hours, or for at least about 5 hours, for example, about 5, 6, 7, 8, 9, 10, 12, 14, 18, or 24 hours. The specific time and temperature of heating can vary. A shorter heating time, such as, for example, about 20 minutes, can be utilized if the temperature is sufficiently high to attach at least a portion of the anchor material to at least a portion of the metal component. In one aspect, the contacted anchor material and metal component is heated at about 1,650° C. for a period of about 2 hours. In another aspect, the contacted anchor material and metal component are heated at about 1,700° C for a period of about 20 minutes. The anchor material and metal component can be heated at a higher temperature and/or for a longer period of time, provided that the increased heating does not adversely affect the materials and/or their ability to fuse and interlock a bonding agent. The anchor material and metal component can be heated at a lower temperature and/or for a shorter period of time, provided that at least a portion of the anchor material can fuse to at least a portion of the metal component.

During heating, pressure, such as, for example, a compressive. force, can optionally be applied to the anchor material and the metal component to enhance and/or speed the attachment process. The pressure applied, if any, can vary depending upon the specific materials and heating conditions. In one aspect, a pressure of at least about 1 psi is applied to the anchor material and metal component during heating. In another aspect, a pressure of at least about 10 psi is applied to the anchor material and metal component during heating.

Other techniques for attaching materials, such as, for example, welding and/or adhesive techniques, can be utilized provided that materials attached using such techniques are stable at temperatures to which the metal component will be exposed. One or more techniques can be used to attach an anchor material to a metal component. Metal fusing and welding techniques are known in the art and one of skill in the art could readily select an appropriate technique and conditions for attaching an anchor material to a metal component.

If a metal component is not originally provided in a form or shape suitable for the intended application, it can optionally be formed into such a desired shape either prior to, simultaneous to, or subsequent to the attachment process. In one aspect, a platinum sheet is provided and is formed into a pipe prior to the attachment process. In another aspect, a platinum sheet is provided and is formed into a pipe after the attachment process.

Bonding Agent

The bonding agent of the present invention can be any suitable agent for the intended application that can form a mechanical and/or interlocking bond between an anchor material and a ceramic material. Such a bonding agent can flow through and/or around an anchor material, such as a metal mesh or metal particles, such that, when dried, fired, and/or cured, at least a portion of the bonding agent is embedded or substantially embedded in at least a portion of the anchor material.

In one aspect, the bonding agent is a castable ceramic material, such as, for example, $ZrO_2$, $SiO_2$, CaO, MgO, $Al_2O_3$, other refractory oxides, and/or mixtures thereof. As used herein, the term bonding agent can refer to a material that is not solidified, such as, for example, a slurry or mixture of ceramic components, or to a dried, fired, and/or cured material that fills at least a portion of a conduit in the ceramic material and is embedded or substantially embedded in at least a portion of an anchor material. In another aspect, the bonding agent comprises the same or substantially the same composition of the ceramic material.

The bonding agent can comprise an individual or multiple bonding agents of varying compositions, particle sizes, and phases. The bonding agent can also comprise additives and/or sintering aids. In one aspect, the bonding agent can comprise at least one additive to control and/or adjust the rheological properties, such as, for example, viscosity, of the bonding agent. In another aspect, the bonding agent is compatible with conventional glass forming and/or delivery systems. In various aspects, the bonding agent is capable of enduring temperatures typical of those in a glass forming and/or delivery system, for example, up to about 1,400, 1,450, 1,500, 1,550, 1,600, 1,650, or 1,700° C. or more. Bonding agents are commercially available and one of skill in the art could readily select an appropriate bonding agent for use in a particular article and/or application.

Application of Bonding Agent

Figure 2:
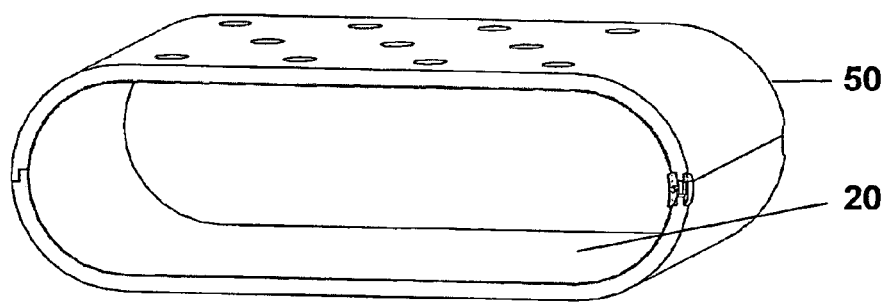
FIG. 2 is a schematic view of an assembled holey clam shell in accordance with various aspects of the present invention.
Figure 3:
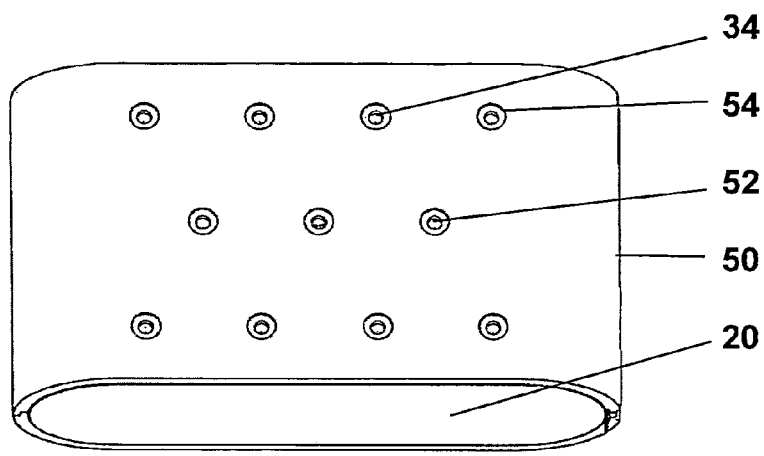
FIG. 3 is a schematic illustrating a top view of a holey clam shell component and a plurality of casting holes, through which mesh patches and a thermocouple welding pad are visible, in accordance with various aspects of the present invention.

Prior to assembly of the one or more pieces of ceramic material and the metal component, the one or more pieces of ceramic material can optionally be sealed with at least one of a paste cement, castable ceramic, seal agent, such as a glass frit material. Such a sealing step, if performed, can improve the operational lifetime of a ceramic material by preventing oxygen diffusion into the material. After assembly of the one or more pieces of ceramic material with the metal component, such that at least a portion of the at least one conduits is in overlying registration with at least a portion of an anchor material, as illustrated in FIGS. 2 and 3, the boding agent of the present invention can be applied in at least a portion of at least one conduit of the ceramic material using any suitable technique. In one aspect, the bonding agent is applied from the exterior surface of the ceramic material such that at least a portion thereof flows through, around, and/or over at least a portion of the anchor material located at the opposing end of the conduit. Depending on the physical properties, such as rheology, the bonding agent can be applied at various times, such as, for example, prior to assembly of the ceramic material and the metal component, provided that a sufficient quantity of the bonding agent remains in the conduit so as to provide the desired interlocking bond with at least a portion of an anchor material positioned on the metal component.

The application of bonding agent to one or more conduits in the ceramic material can be performed simultaneously or sequentially. It is not necessary that all conduits be filled with bonding agent nor that bonding agent be applied in all conduits at the same time. Such a design can provide greater flexibility during assembly than previous methods.

In one aspect, a castable ceramic bonding agent, such as, for example, a zirconia, can be mixed with a binder and then be pasted into one or more conduits. The viscosity of the bonding agent should be such that at least a portion of the bonding agent will flow into and fill the mesh openings of a metal mesh anchor material attached to a metal component. In a preferred aspect, a quantity of bonding agent is applied sufficient to flow through or around at least a portion of an anchor material and to fill a conduit such that a rivet shaped plug of bonding agent is formed.

Any portion of applied bonding agent that extends beyond the conduit and the exterior surface of the ceramic material can optionally be removed by, for example, scrubbing, scraping, and/or grinding, so that a the exterior surface of the ceramic material is substantially flat.

In another aspect, the bonding agent is applied such that at least a portion of the attached anchor material is embedded or substantially embedded in at least a portion of the bonding agent. It is not necessary that an anchor material be completely embedded in a bonding agent, provided that one or more anchor materials are embedded to the extent necessary to mechanically bond a portion of the ceramic material to at least a portion of a metal component. In one aspect, at least one anchor material is completely embedded in a bonding agent. In another aspect, at least one anchor material is substantially embedded in a bonding agent, such that the anchor material interlocks with the bonding agent. In another aspect, a metal mesh anchor material has a least a portion of the mesh openings filled with the bonding agent. In yet another aspect, at least a portion of a plurality of metal particles are at least partially surrounded by at least a portion of the bonding agent.

The rheological properties of a bonding agent can be controlled and/or adjusted with additives such that at least a portion of the bonding agent can flow through, around, and/or over at least a portion of the anchor material. A bonding agent applied in such manner can be allowed to solidify or harden such that a mechanical bond is formed between the anchor material/metal component combination and the bonding agent.

After application, a bonding agent can be solidified. Such solidification can, in one aspect, comprise allowing the bonding agent to dry, harden, and/or cure without additional steps. In another aspect, solidification can comprise heating and/or firing the applied bonding agent. In one aspect, the applied bonding agent can have a green body strength sufficient for the intended application. In one aspect, the cast bonding agent can be dried for a period of from about 10 to about 48 hours prior to firing.

EXAMPLES

To further illustrate the principles of the present invention, the following examples are put forth so as to provide those of ordinary skill in the art with a complete disclosure and description of how the methods and articles, devices claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Attachment of Platinum Mesh to Platinum Plate (Prophetic)

In a first example, about 10 pieces of a platinum/rhodium (90/10 wt. %) alloy 20 mesh screen having a nominal wire diameter of 0.008 inches can be attached to a platinum plate. The pieces of mesh can be cut into approximately 1 inch by 1 inch squares and positioned in discrete locations on top of the platinum plate. The mesh/plate combination can then be spot welded to the plate.

Example 2

Attachment of Ceramic Plate (Prophetic)

In a second example, an alumina plate having about 10 holes can be provided, where the holes are positioned in approximately the same pattern as the pieces of anchor material in Example 1. Each hole can be about 0.75 inches in diameter and have a larger countersunk portion on both surfaces of the alumina plate. The alumina plate can be placed adjacent to the platinum plate such that at least a portion of each of the holes in the alumina plate are aligned with the metal mesh attached to the metal plate. Then, a castable alumina can be prepared with a viscosity such that the castable alumina can flow through the holes of the metal mesh. Each of the holes in the alumina plate can then be filled with the castable alumina. The castable alumina can then be allowed to dry.

What is claimed is:

1. A method for mechanically bonding a metal component to a ceramic material, comprising:
   a. providing a metal component comprising an anchor material attached to at least a first portion of one surface of the metal component;
   b. providing a ceramic material having a first surface and a second surface, wherein the ceramic material defines at least one conduit extending from the first surface to the second surface, wherein the at least one conduit has a first open end defined by the first surface, a second open end defined by the second surface, a continuous sidewall, and a cross sectional area;
   c. positioning the ceramic material such that at least a portion of at least one of the first open end and the second open end of the at least one conduit is in overlying registration with at least a portion of the anchor material; and
   d. applying a castable ceramic bonding agent into at least a portion of the at least one conduit from the first surface of the ceramic material such that at least a portion of the castable ceramic bonding agent flows in at least one of following manners: (1) through; (2) around; and (3) over at least a portion of the anchor material located at an opposing end of the at least one conduit, and wherein the first surface of the ceramic material is an exterior surface; and
   e. solidifying the castable ceramic bonding agent to form a mechanical bond which is capable of enduring temperatures above 1400° C.;
   wherein the metal component comprises at least one noble metal and noble metal alloy thereof, at least one platinum group metal and platinum group metal alloy thereof, or a combination thereof, and
   wherein the castable ceramic bonding agent is capable of enduring temperatures above 1400° C.

2. The method of claim 1, wherein the metal component comprises a plurality of anchor materials.

3. The method of claim 1, wherein the ceramic material defines a plurality of conduits, wherein each conduit has a first open end defined by the first surface, a second open end defined by the second surface, a continuous sidewall, and a cross sectional area.

4. The method of claim 1, wherein after step c), at least a portion of the second surface of the ceramic material is in contact with at least a portion of the one surface of the metal component.

5. The method of claim 1, wherein step c) is performed before step d), and wherein steps a) and b) can be performed in any order.

6. The method of claim 1, wherein the cross sectional area of the at least one conduit is larger at the first surface or the second surface than at any other point of the conduit.

7. The method of claim 1, wherein the cross sectional area of the at least one conduit is larger at both the first and second surfaces than at any other point of the at least one conduit.

8. The method of claim 1, wherein the continuous sidewall of the at least one conduit has a stepped profile, and wherein the cross sectional area at a center of the at least one conduit is smaller than the cross sectional area of at least one of the first surface and the second surface of the at least one conduit.

9. The method of claim 1, wherein the metal component comprises platinum, a platinum alloy, or a combination thereof.

10. The method of claim 1, wherein the anchor material comprises a metal mesh, and wherein the metal mesh has multiple openings through which flows at least a portion of the castable ceramic bonding agent.

11. The method of claim 1, wherein the anchor material comprises platinum, a platinum alloy, or a combination thereof.

12. The method of claim 1, wherein step a) comprises attaching an anchor material to at least a first portion of one surface of the metal component.

13. The method of claim 12, wherein the attaching comprises:
   a. contacting the anchor material with at least a portion of one surface of the metal component; and then
   b. heating the contacted metal component and anchor material at a time and temperature sufficient to fuse at least a portion of the anchor material to the metal component.

14. The method of claim 12, wherein the attaching comprises a welding technique.

15. The method of claim 12, wherein the attaching comprises at least one of an arc welding, resistance welding, fusion welding, spot welding, seam welding, electron beam welding, ultrasonic welding, laser welding technique, or a combination thereof.

16. The method of claim 1, wherein the metal component comprises at least one of a noble metal and a noble metal alloy thereof.

17. The method of claim 1, wherein the ceramic material is a portion of a glass forming and/or delivery apparatus.

18. The method of claim 1, wherein the anchor material comprises a plurality of metal particles, and wherein at least a portion of the castable ceramic bonding agent flows around at least a portion of the plurality of metal particles.

19. The method of claim 18, wherein the plurality of metal particles have at least one of following: (1) a regular shape; (2) an irregular shape; and (3) varying shapes.

20. The method of claim 1, wherein the anchor material comprises a sheet metal structure.

21. The method of claim 20, wherein the sheet metal structure is a corrugated piece of metal that accepts and interlocks the castable ceramic bonding agent.

22. The method of claim 20, wherein the sheet metal structure is a formed piece of metal that accepts and interlocks the castable ceramic bonding agent.

* * * * *